(12) United States Patent
Herron et al.

(10) Patent No.: US 12,361,772 B1
(45) Date of Patent: *Jul. 15, 2025

(54) ADAPTIVE VEHICLE DIAGNOSTIC SYSTEM AND METHOD

(71) Applicant: Opus IVS, Inc., Ann Arbor, MI (US)

(72) Inventors: Brian J. Herron, Dexter, MI (US); Robert A. Augustine, Ventura, CA (US); Michael D. Jurmo, Canton, MI (US); Robert Russell, Ann Arbor, MI (US)

(73) Assignee: Opus IVS, Inc., Dexter, MI (US)

( * ) Notice: Subject to any disclaimer, the term of this patent is extended or adjusted under 35 U.S.C. 154(b) by 161 days.

This patent is subject to a terminal disclaimer.

(21) Appl. No.: 17/971,757

(22) Filed: Oct. 24, 2022

Related U.S. Application Data (63) Continuation of application No. 17/509,316, filed on Oct. 25, 2021, which is a continuation-in-part of application No. 16/449,998, filed on Jun. 24, 2019, now Pat. No. 11,257,307.

(51) Int. Cl.
*G07C 5/08* (2006.01)
*G07C 5/00* (2006.01)

(52) U.S. Cl.
CPC .............. *G07C 5/085* (2013.01); *G07C 5/008* (2013.01); *G07C 5/0808* (2013.01); *G07C 2205/02* (2013.01)

(58) Field of Classification Search
None
See application file for complete search history.

(56) References Cited

U.S. PATENT DOCUMENTS

| | | |
|---|---|---|
| 6,154,658 A | 11/2000 | Caci |
| 6,728,603 B2 | 4/2004 | Pruzan et al. |
| 6,879,894 B1 | 4/2005 | Lightner et al. |
| 6,956,501 B2 | 10/2005 | Kitson |
| 7,092,803 B2 | 8/2006 | Kapolka et al. |
| 7,373,226 B1 | 5/2008 | Cancilla et al. |
| 7,502,672 B1 | 3/2009 | Kolls |
| 7,519,458 B2 | 4/2009 | Buckley |
| 7,532,962 B1 | 5/2009 | Lowrey et al. |

(Continued)

FOREIGN PATENT DOCUMENTS

WO 2004092857 A2 10/2004

OTHER PUBLICATIONS

Article entitled "Remote Vehicle Diagnostic System Using Mobile Handsets" by Doo-Hee Jung, Gu-Min Jeong, and Hyun-Sik Ahn, understood to be from the proceedings of the Jun. 2006 International Conference on Wireless Networks, ICWN 2006, Las Vegas, Nevada.

(Continued)

*Primary Examiner* — Abdhesh K Jha
(74) *Attorney, Agent, or Firm* — Gardner, Linn, Burkhart & Ondersma LLP (57) ABSTRACT

A method and system of diagnosing a vehicle with a vehicle diagnostic system that is configured to scan an electrical system of a vehicle for error codes. The vehicle diagnostic system is operatively connected with the electrical system of a vehicle via a diagnostic port of the vehicle, with the vehicle diagnostic system determining whether the vehicle is equipped with Advanced Driver Assistance Systems (ADAS).

18 Claims, 5 Drawing Sheets

(56) References Cited

U.S. PATENT DOCUMENTS

| | | |
|---|---|---|
| 7,584,030 B1 | 9/2009 | Graham |
| 7,786,851 B2 | 8/2010 | Drew et al. |
| 7,840,812 B1 | 11/2010 | Levenberg |
| 7,928,837 B2 | 4/2011 | Drew et al. |
| 8,190,322 B2 | 5/2012 | Lin et al. |
| 8,259,936 B2 | 9/2012 | Mahalingaiah |
| 8,306,687 B2 | 11/2012 | Chen |
| 8,339,254 B2 | 12/2012 | Drew et al. |
| 8,352,577 B2 | 1/2013 | Martone |
| 8,638,207 B2 | 1/2014 | Drew et al. |
| 8,688,313 B2 | 4/2014 | Margol et al. |
| 8,909,416 B2 | 12/2014 | Chen et al. |
| 8,918,245 B2 | 12/2014 | Dewhurst et al. |
| 9,430,884 B2 | 8/2016 | Drew et al. |
| 9,530,255 B2 | 12/2016 | Drew et al. |
| 9,563,988 B2 | 2/2017 | Drew et al. |
| 9,646,130 B2 | 5/2017 | Drew et al. |
| 10,013,816 B2 | 7/2018 | Nassar et al. |
| 10,146,521 B2 | 12/2018 | West et al. |
| 10,181,225 B2 | 1/2019 | Liebl et al. |
| 10,282,924 B2 | 5/2019 | Drew et al. |
| 10,414,277 B1 | 9/2019 | Herron et al. |
| 10,445,953 B1 | 10/2019 | Herron et al. |
| 10,706,645 B1 | 7/2020 | Herron et al. |
| 10,719,813 B1 | 7/2020 | Beckmann et al. |
| 10,748,356 B1 | 8/2020 | Herron et al. |
| 11,062,534 B2 | 7/2021 | Jingle et al. |
| 11,210,869 B2 | 12/2021 | Balan |
| 2001/0056544 A1 | 12/2001 | Walker |
| 2003/0001720 A1 | 1/2003 | Wade et al. |
| 2003/0020759 A1 | 1/2003 | Cancilla et al. |
| 2004/0044454 A1 | 3/2004 | Ross et al. |
| 2004/0167689 A1 | 8/2004 | Bromley et al. |
| 2005/0021294 A1 | 1/2005 | Trsar et al. |
| 2005/0038581 A1 | 2/2005 | Kapolka et al. |
| 2005/0060070 A1 | 3/2005 | Kapolka et al. |
| 2005/0182537 A1 | 8/2005 | Tefft et al. |
| 2005/0240555 A1 | 10/2005 | Wilde et al. |
| 2005/0251304 A1 | 11/2005 | Cancellara et al. |
| 2006/0052921 A1 | 3/2006 | Bodin et al. |
| 2006/0106508 A1 | 5/2006 | Liebl et al. |
| 2006/0211446 A1 | 9/2006 | Wittmann et al. |
| 2007/0005201 A1 | 1/2007 | Chenn |
| 2007/0043488 A1 | 2/2007 | Avery et al. |
| 2007/0050105 A1 | 3/2007 | Chinnadurai et al. |
| 2007/0055420 A1 | 3/2007 | Krzystofczyk et al. |
| 2007/0073460 A1 | 3/2007 | Bertosa et al. |
| 2007/0185624 A1 | 8/2007 | Duddles et al. |
| 2007/0204215 A1 | 8/2007 | Mueller et al. |
| 2007/0233340 A1 | 10/2007 | Raichle et al. |
| 2008/0177438 A1 | 7/2008 | Chen et al. |
| 2008/0269975 A1 | 10/2008 | Bertosa |
| 2008/0280602 A1 | 11/2008 | Ban |
| 2008/0306645 A1 | 12/2008 | Dewhurst et al. |
| 2009/0062978 A1 | 3/2009 | Picard |
| 2009/0118899 A1 | 5/2009 | Carlson |
| 2009/0119657 A1 | 5/2009 | Link, II |
| 2009/0187976 A1 | 7/2009 | Perroud et al. |
| 2009/0265055 A1 | 10/2009 | Gillies |
| 2009/0276115 A1 | 11/2009 | Chen |
| 2010/0042287 A1 | 2/2010 | Zhang |
| 2010/0174446 A1 | 7/2010 | Andreasen et al. |
| 2010/0204878 A1 | 8/2010 | Drew et al. |
| 2010/0205450 A1 | 8/2010 | Samnacke et al. |
| 2010/0262335 A1 | 10/2010 | Brozovich |
| 2011/0071709 A1 | 3/2011 | Damiani et al. |
| 2011/0112718 A1 | 5/2011 | Claus et al. |
| 2011/0153150 A1 | 6/2011 | Drew et al. |
| 2011/0276218 A1 | 11/2011 | Dwan |
| 2011/0313593 A1 | 12/2011 | Cohen et al. |
| 2012/0046826 A1 | 2/2012 | Panko |
| 2012/0254345 A1 | 10/2012 | Montoya |
| 2014/0277909 A1 | 9/2014 | Bertosa et al. |
| 2014/0279230 A1 | 9/2014 | Bertosa et al. |
| 2015/0121275 A1 | 4/2015 | Marshall et al. |
| 2017/0301154 A1 | 10/2017 | Rozint |
| 2021/0354707 A1* | 11/2021 | Patnala ............... G07C 5/0808 |

OTHER PUBLICATIONS

Thesis entitled "Remote Connection of Diagnostic Tool" by Irina Elena Apetri and Ali Raza, Chalmers University of Technology, dated 2011.

* cited by examiner

ADAPTIVE VEHICLE DIAGNOSTIC SYSTEM AND METHOD

CROSS REFERENCE TO RELATED APPLICATION

The present application is a continuation of U.S. application Ser. No. 17/509,316, filed on Oct. 25, 2021, which is a continuation-in-part of U.S. application Ser. No. 16/449,998, filed on Jun. 24, 2019, which are hereby incorporated herein by reference in their entireties.

BACKGROUND OF THE INVENTION

The present invention is directed to a vehicle diagnostic system, and in particular to an adaptive vehicle scan selection with a vehicle diagnostic device.

Vehicle diagnostic systems employing diagnostic scan devices or tools are used in automotive repair facilities to diagnose and repair computer-based vehicle systems, where vehicles may have differing computer-based systems depending on the configuration and options installed on the vehicle. Vehicle diagnostic scan systems may include or use one or more diagnostic software scanning programs or applications, such as applications developed by an original equipment automotive manufacturer ("OEM"), or an aftermarket diagnostic company. OEM diagnostic applications may include proprietary diagnostic application software exclusive to a particular OEM, and may be required for particular computer-based vehicle systems of a vehicle, such as for Adaptive Driver Assistance Systems ("ADAS") of a vehicle.

SUMMARY OF THE INVENTION

The present invention provides a vehicle diagnostic system, and in particular a diagnostic system that queries/scans a vehicle for vehicle data information that is read and evaluated to determine whether or not the vehicle includes, or the presence or absence, of particular vehicle systems, such as ADAS systems, or other such safety systems, and based thereon selectively controls the diagnostic scanning of the vehicle. Based on a determination of the presence or absence of particular vehicle systems, such as safety systems and/or what specific safety systems are included in the vehicle, the diagnostic system determines and controls the depth of diagnostic scanning required for the vehicle, including the diagnostic scanning programs to be used.

In one embodiment the diagnostic system reads a vehicle identification number (VIN) of the vehicle under evaluation, with the VIN being analyzed or parsed to determine the safety systems residing on the vehicle, and with the diagnostic system then utilizing an appropriate diagnostic scanning program for the given vehicle. Alternatively, the vehicle data information read by the diagnostic system comprises part numbers of electronic control units (ECUs) contained on the vehicle, with the ECU part numbers analyzed or parsed to determine which if any pertain to particular vehicle systems, such as vehicle ADAS safety systems, and with the diagnostic system then utilizing an appropriate diagnostic scanning program for the given vehicle. Less invasive diagnostic scanning programs may be utilized in instance in which it is determined that the vehicle is not equipped with particular vehicle systems, such as ADAS systems. In contrast, upon determination of the presence of safety systems, appropriate diagnostic scanning programs may be utilized that provide more in-depth scanning of the vehicle ECUs, such as to locate relevant fault or error codes.

According to an aspect of the present invention, a method of diagnosing a vehicle electrical system includes connecting a vehicle interface device with a diagnostic port of a vehicle so as to be in communication with an electrical system of the vehicle, reading vehicle data information of the vehicle with the vehicle interface device, determining whether particular electrical vehicle systems are present on the vehicle based on the vehicle data information, and selecting a diagnostic scanning program from a plurality of available diagnostic scanning programs based on said determining whether particular electrical vehicle systems are present, wherein the selected diagnostic scanning program is configured to determine fault codes in the electrical system of the vehicle. In particular this includes determining whether the vehicle includes Advanced Driver Assistance Systems (ADAS) electrical vehicle systems.

In particular embodiments reading vehicle data information of the vehicle comprises reading a vehicle identification number (VIN) of the vehicle, and determining whether particular electrical vehicle systems are present on the vehicle occurs via a database to analyze the VIN of the vehicle, where the database comprises a VIN database that includes information regarding the electrical vehicle systems present on the vehicle based on the VIN of the vehicle.

In alternative embodiments reading vehicle data information of the vehicle comprises reading electronic control unit (ECU) part numbers of the vehicle, and determining whether particular electrical vehicle systems are present on the vehicle comprises using a database to analyze the ECU part numbers of the vehicle, where the database comprises an ECU part number database that includes ECU part numbers for ADAS system ECUs.

A vehicle diagnostic system in accordance with the present invention includes a vehicle interface device configured to be operatively connected with a vehicle in order to diagnose an electrical system of the vehicle, a diagnostic evaluation program configured to query the electrical system of the vehicle when the vehicle interface device is connected with the vehicle, with the diagnostic evaluation program operative to read vehicle data information from the electrical system of the vehicle. The vehicle diagnostic system further includes a computer device communicatively connected with the vehicle interface device and operable to obtain the vehicle data information from the diagnostic evaluation program. The computer device is configured to access a database to determine whether the vehicle includes particular vehicle systems based on the vehicle data information to designate which diagnostic scanning program from a plurality of diagnostic scanning programs is to be used to diagnose the electrical system of the vehicle.

In a particular embodiment the vehicle interface device and computer device are separate devices connected by a cable or a wireless connection, with the computer device including the diagnostic evaluation program and a plurality of diagnostic scanning programs. In accordance with the invention the database may reside on the computer device, or may reside on a remote computer device.

The vehicle diagnostic system of the present invention enables repair facilities to accurately and efficiently scan/query a vehicle for fault codes by using the diagnostic scanning program that is most efficient and least expensive with respect to monetary cost and test duration for the given vehicle by scanning the vehicle electrical system based on the vehicle systems present on the vehicle, including any ADAS systems and associated ECUs on the vehicle. The ability to determine whether the vehicle under test is equipped with particular vehicle systems, such as ADAS ECUs, allows the system to selectively use a proprietary manufacturer supplied scanning program as needed, or use an alternative third-party supplied scanning program when the vehicle under test is not equipped with ADAS ECUs. These and other objects, advantages, purposes and features of this invention will become apparent upon review of the following specification in conjunction with the drawings.

DESCRIPTION OF THE PREFERRED EMBODIMENTS

Figure 1:
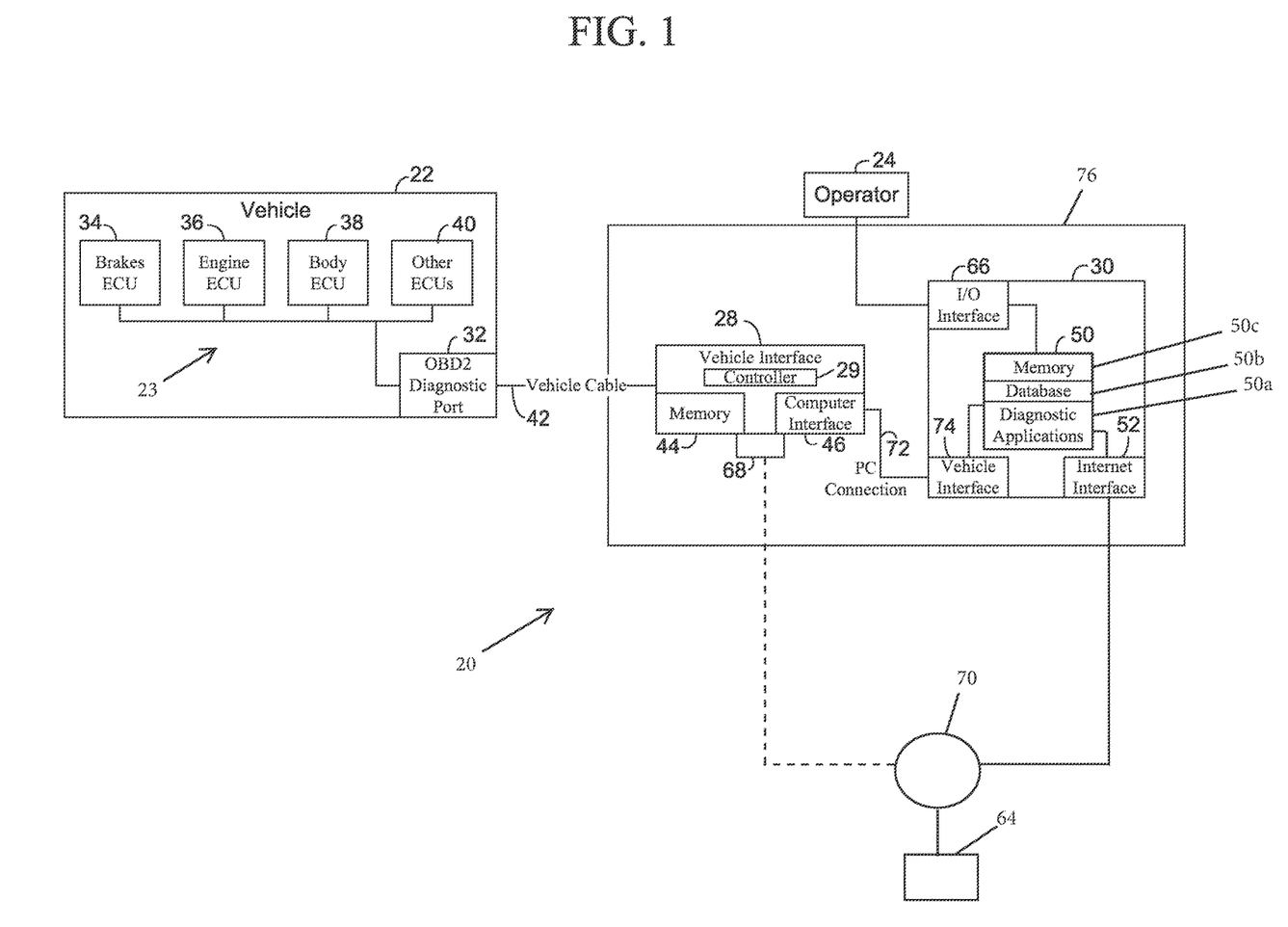
FIG. 1 is a block diagram of a vehicle diagnostic system in accordance with the present invention shown in relation to a vehicle.

The present invention will now be described with reference to the accompanying figures, wherein the numbered elements in the following written description correspond to like-numbered elements in the figures. A vehicle diagnostic system 20 for use with a vehicle 22 is shown for use by a mechanic or operator 24, such as in an automotive repair facility. System 20 is illustrated in FIG. 1 as including a vehicle diagnostic tool, referred to as a vehicle interface device or interface tool 28. The vehicle interface device 28 may be communicatively coupled to a local computer 30. In use, vehicle interface device 28 is connected with vehicle 22 by operator 24, such as by connecting to an on-board diagnostic ("OBD") diagnostic port 32 of the vehicle 22 in order to diagnose the electronic system 23 of vehicle 22, including various vehicle electronic control units (ECUs), such as an engine ECU 34, body ECU 36, brakes ECU 38, and/or other ECUs 40, and including other electronic parts and components of vehicle 22. Vehicle interface device 28 connects with port 32, such as via vehicle cable 42. Vehicle interface device 28 includes a controller 29, such as in the form of a processor or micro-processor and interface circuitry to facilitate communication between the ECUs and the interface tool 28, with interface tool 28 including a database of vehicle protocols found in a local memory 44 that allow communication with the ECUs of various makes and models of vehicles. Vehicle interface device 28 additionally includes a computer interface 46 for connection with computer 30, such as via standard interfaces 74, such as USB, Bluetooth, Wi-Fi, or the like. As understood from FIG. 1, one or both of vehicle interface device 28 and local computer 30 may be connected to a remote computer, such as a server 64, such as by an Internet 70 connection.

Figure 1A:
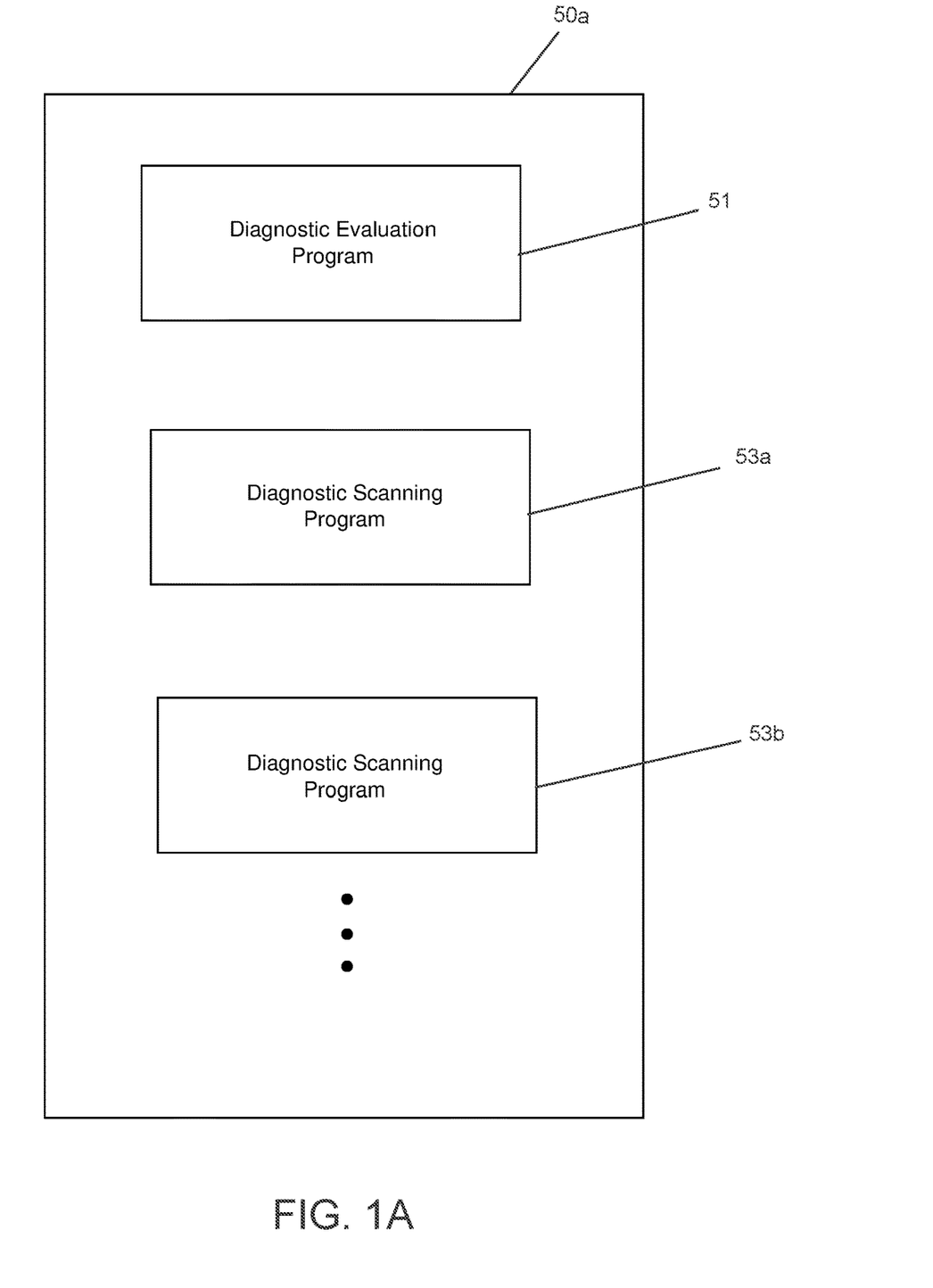
FIG. 1A is a block diagram of diagnostic applications of the vehicle diagnostic system of FIG. 1.

Vehicle diagnostic system 20 may be configured to be selectively operable in one of a plurality of different modes, whereby a technician may use the interface device for vehicle maintenance, diagnosis, programming and repair as needed. In accordance with an embodiment of the present invention, system 20 includes diagnostic applications 50a, including a diagnostic evaluation program application 51 (FIG. 1A) for querying/scanning the vehicle 22 to read vehicle data information regarding the systems present on the vehicle, with the vehicle data information being analyzed or parsed to determine the particular vehicle systems provided on the vehicle. Upon the determination of the vehicle systems present on the vehicle, a diagnostic scanning program 53a or 53b is run by system 20 to locate fault codes throughout the vehicle electronic system.

In the illustrated embodiment computer 30 is operatively connected with vehicle interface device 28, with computer 30 including one or more commercially available diagnostic application scanning programs 53a, 53b that are configured for use with the specific vehicle 22 and may be used depending on the vehicle systems present on vehicle 22. Although shown as having two diagnostic application programs 53a, 53b, it should be appreciated that system 20 may include more than two such programs available for use with a given vehicle 22. Interface device 28 may be configured as an SAE standard J2534 device, such as a device compliant with the J2534-2 standard, or as an ISO compliant or other standard compliant device for supporting and enabling communication with the electronic systems of a vehicle.

As illustrated in FIG. 1, the diagnostic application scanning programs 53a, 53b are stored in a memory 50. An exemplary diagnostic application scanning program comprises a program provided by an automotive manufacturer or a company that supplies diagnostic application programs, such as Snap-On Incorporated, with the diagnostic application scanning tool configured to enable the reading and reporting of fault codes in the electronic system of the vehicle such as may be located in ECUs of the vehicle. In practice, memory 50 may include multiple diagnostic application programs, each for use with various makes and/or models of vehicles to enable diagnosing and programming of ECUs via vehicle interface device 28, including depending on the particular vehicle systems/ECUs on the vehicle installed by the OEM based on the customer's selection of vehicle options. Alternatively and/or additionally, memory 50 may include diagnostic application programs that may be used with multiple variations of vehicles. Vehicle interface device 28 and computer 30 are thus cooperatively used for querying/scanning and diagnosing ECUs of vehicle 22, including for accessing error codes generated by the ECUs for assessing and diagnosing operational and performance related aspects of the vehicle 22.

It should be appreciated that different vehicles may be equipped with different ECUs, including that some vehicles of the same make/model may have different or additional ECUs when compared to other vehicles of the same make/model. For example, a given vehicle may be sold with or without advanced driver-assistance systems (ADAS), such as adaptive cruise control, lane departure warning, parking assistance, blind spot detection, and other driver assistance systems. Each ADAS subsystem may include its own additional ECUs, or an ECU may be shared for more than one ADAS feature, where such additional ECUs must be queried/scanned, accessed, and then assessed. It should be appreciated that vehicles with the additional ADAS subsystems and corresponding additional ECUs will require a more extensive scanning program that is capable of interfacing with the additional ECUs of the equipped ADAS subsystems. Correspondingly, the same vehicle make and model without additional ADAS subsystems will not have the additional ECUs.

Interfacing and interrogation with every ECU of a vehicle allows all fault codes to be ascertained. An OEM supplied diagnostic scanning program may operate to perform an in-depth scan regardless of the vehicle configuration, including whether or not the vehicle includes ADAS systems, whereby all possible ECUs for a particular model of a vehicle are routinely queried by the vehicle diagnostic system 20 whether they are actually in the vehicle 22 or not. While a proprietary manufacturer supplied scanning program may provide an assurance that all ECUs on a vehicle under test have been queried/scanned and assessed, such scanning programs are often costly, including in terms of requiring a significant length of time to operate as the scanning program methodically queries/scans for each ECU the vehicle may be equipped with, whether or not the vehicle is in fact equipped with any given ECU, as well as having a substantial financial cost as there are monetary charges associated with utilizing the proprietary scanning program, including such as costs for each use or running of the proprietary scanning program. In accordance with aspects of the present invention, therefore, prior to running a diagnostic scanning program, an evaluation may be performed to determine the vehicle systems present on the subject vehicle and whereby a diagnostic scanning program may be selected that is suited to use with the vehicle, including to expedite the vehicle scanning and avoid unnecessary time and expense associated with running a diagnostic scanning program that is not required for the vehicle. Rather, a diagnostic scanning program may be run that is not configured to query all possible ECUs that a vehicle may possibly be equipped with, such as for example not querying ECUs associated with ADAS systems that are not present on the vehicle.

Accordingly, prior to selecting a diagnostic scanning program 53a, 53b for use with a given vehicle, a diagnostic evaluation program 51 may initially be run to read or obtain vehicle data information related to the equipped vehicle systems on the vehicle. In one embodiment the diagnostic evaluation program 51 obtains the vehicle VIN upon connection of system 20 with vehicle 22. As a first step, system 20 via the vehicle interface device 28 may initially acquire a vehicle identification number (VIN) associated with a vehicle under test. In an aspect of the present invention, the vehicle interface device 28 is operable to read the VIN from the vehicle 22 via its connection through the OBD2 diagnostic port 32. The vehicle VIN is then used to determine the vehicle systems equipped on the vehicle. For example, computer 30 may include a database 50b that is operatively used to determine the vehicle systems on the vehicle based on the determined VIN, such as via a VIN database. This may include an algorithmic lookup table based on the identified VIN, such as for example where certain alphanumeric characters of the VIN identify the presence or absence of particular vehicle systems present on the vehicle, such as ADAS systems or other vehicle or safety systems. In response to the identification of the vehicle systems an appropriate diagnostic scanning program 53a, 53b may be selected for use in scanning the electrical system of the vehicle. Alternatively, the VIN for the vehicle 22 may be acquired through alternative means and directly input by the operator 24, such as by being visually examined and input via interface 66, such as by way of a keyboard or touch screen. Moreover, rather than a lookup VIN database, the system 20 may operatively algorithmically analyze selected alphanumerical characters, such as by position number in the VIN, with the system 20 recognizing based on the particular character and location the presence or absence of particular vehicle systems present on the vehicle, such as being preprogrammed. This may include, for example, an operator initially entering a make and model of a vehicle via interface 66 whereby the system 20 is preconfigured to read particular characters in particular locations of the VIN in order to determine the presence or absence of particular vehicle systems present on the vehicle.

Figure 3A:
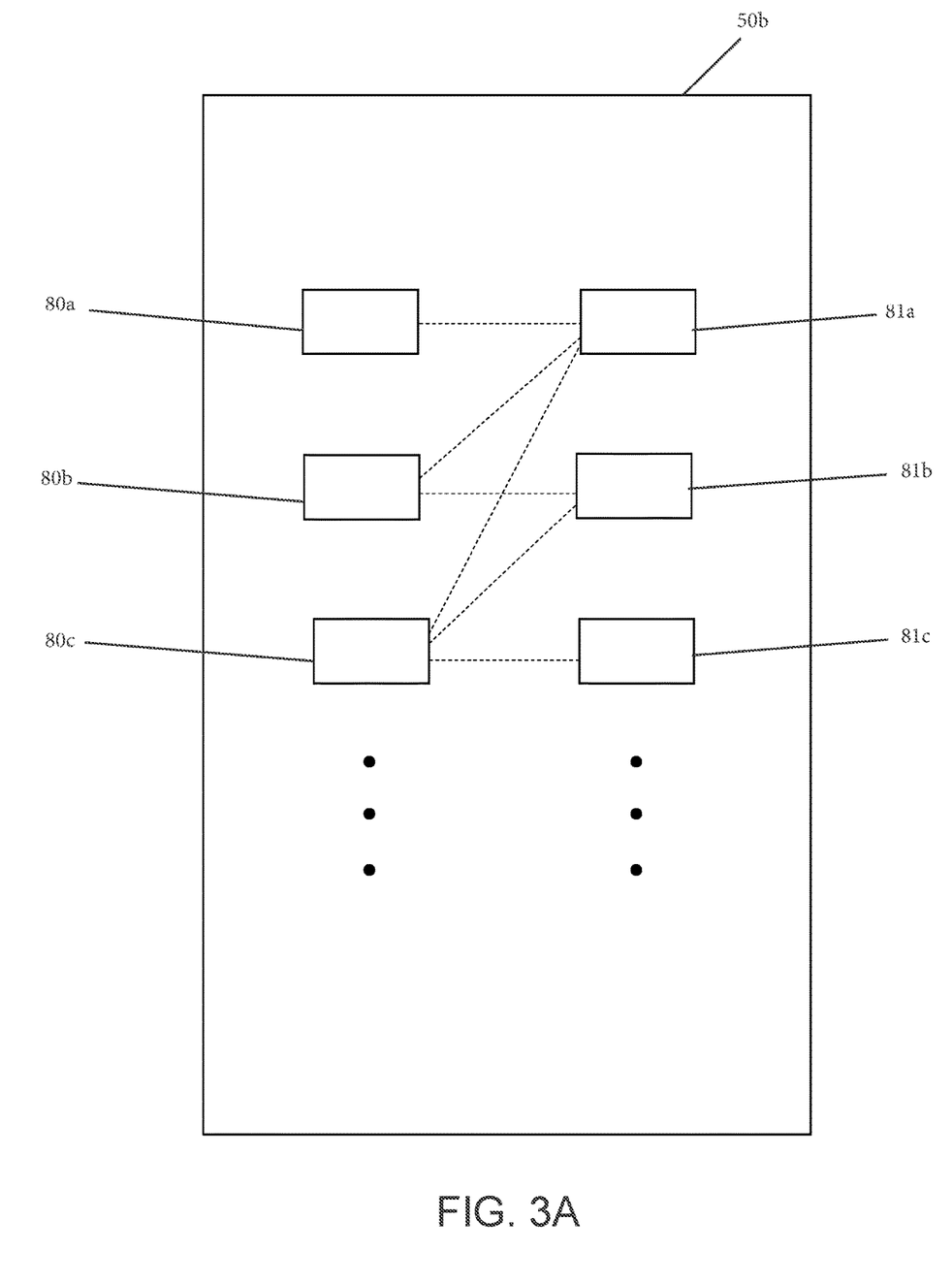
FIG. 3A discloses an exemplary database correlating vehicle identification number data to vehicle systems for a vehicle.

An exemplary embodiment of a database 50b configured as a VIN database is illustrated in FIG. 3A, such as for one particular make and model of vehicle. As there shown, database 50b includes a listing of VIN data 80a, 80b, 80c, where VIN data may comprise complete VIN numbers, ranges of VIN numbers, or selected portions or ranges of VIN numbers for a given make and model vehicle, with the VIN data 80a, 80b, 80c being correlated with vehicle systems 81a, 81b, 81c, where the vehicle systems 81a, 81b, 81c in the illustrated embodiment are ADAS systems such as a forward facing lane keeping assist system, an adaptive cruise control system, and a collision avoidance system. It should be appreciated that although database 50b is illustrated in FIG. 3A to include three separate VIN data designations and three separate vehicle systems, that in practice the VIN database may include numerous listings of VIN data as well as numerous vehicle systems.

In a further alternative embodiment, system 20 may query the electronic system 23 of the vehicle 22 to obtain the part numbers of all ECUs resident on vehicle 22, where the ECU part numbers are readable via interface tool 28 and the connection with OBD diagnostic port 32. The ECU part numbers are then usable to determine which vehicle scanning program 53a, 53b to run. For example, database 50b may additionally or alternatively include an ECU part number database, where a comparison of ECU part numbers obtained via interface tool 28 with ECU part numbers in database 50b provides a decision as to which vehicle scanning program 53a, 53b to run. For example, upon a determination of the presence of one or more ECU part numbers associated with ADAS systems, a proprietary OEM vehicle scanning program application may be run. Alternatively, upon a determination that no ADAS systems are present on the vehicle, an aftermarket vehicle scanning program application may be run. Still further, it should be appreciated that yet other alternative vehicle scanning programs may be run depending on the specific ECUs present on the vehicle 22 under test. For example, programs may be available for vehicle configurations having particular ADAS systems that do not include other ADAS systems, whereby particular known ECUs present can be scanned while avoiding use of a diagnostic scanning program having superfluous capability and functionality.

Figure 3B:
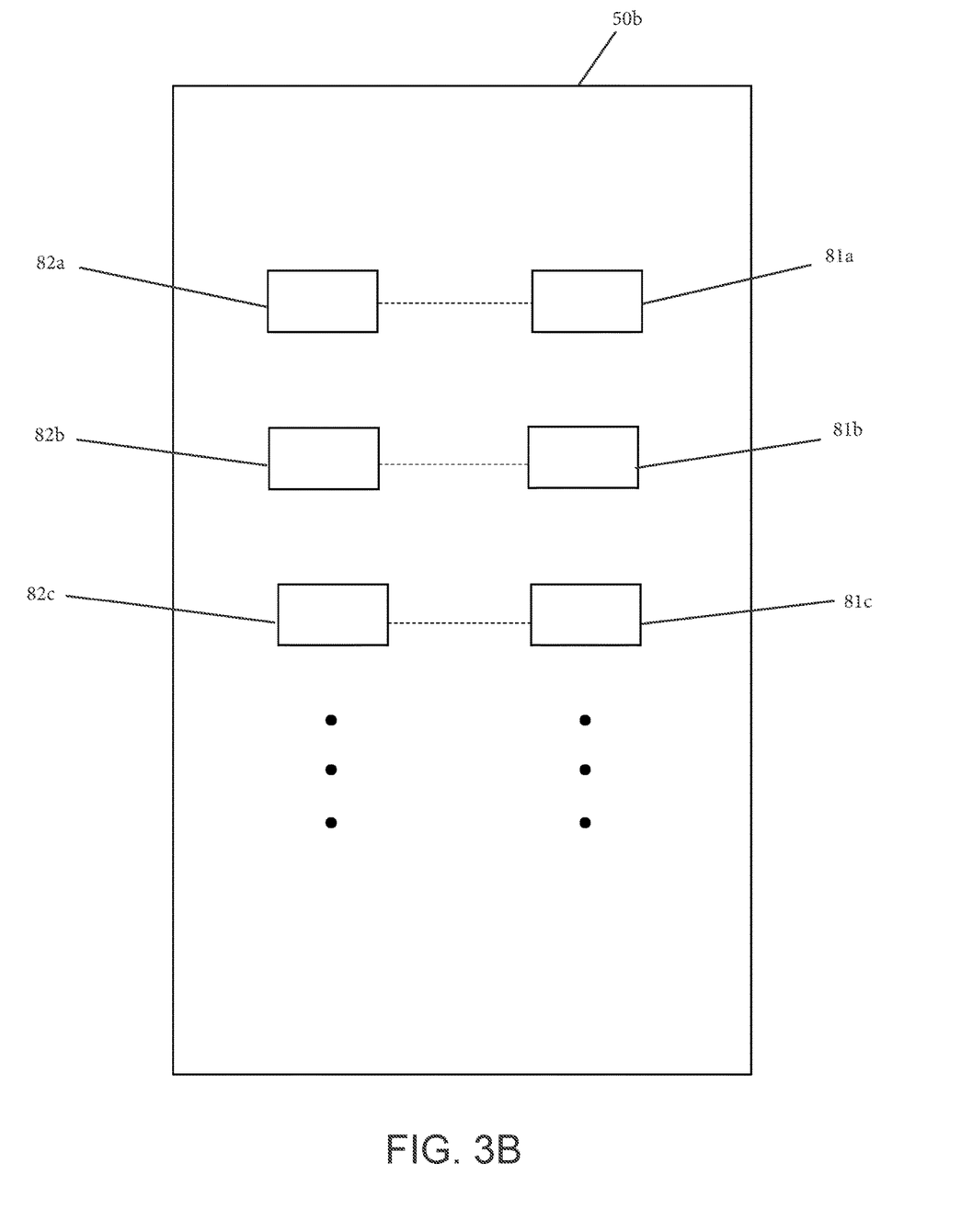
FIG. 3B discloses an exemplary database correlating ECU part numbers to vehicle systems for a vehicle.

An exemplary embodiment of a database 50b configured as an ECU database is illustrated in FIG. 3B. As there shown, database 50b includes a listing of ECU part numbers 82a, 82b, 82c, such as for one particular make and model of vehicle, with the ECU part numbers being correlated with vehicle systems 81a, 81b, 81c, where the vehicle systems 81a, 81b, 81c in the illustrated embodiment are ADAS systems such as a forward facing lane keeping assist system, an adaptive cruise control system, and a collision avoidance system. It should be appreciated that although database 50b is illustrated in FIG. 3B to include three separate ECU part numbers associated with three separate vehicle systems, in practice a vehicle may be equipped with dozens or hundreds of ECUs where by the ECU database may include numerous listings of ECU part numbers as well as numerous vehicle systems.

The vehicle database 50b may further comprise a VIN/ECU part number database that includes a listing of ECU part numbers associated with a given VIN. Therefore, based upon a review of the VIN database and a review of the ECU part numbers associated with the current vehicle's VIN, a selection may be made between a third party supplied scanning program or a manufacturer supplied scanning program. For example, if the VIN database reveals that a given vehicle contains one or more ECU part numbers associated with ADAS ECUs, a decision can be made to select the more comprehensive manufacturer supplied scanning program. In the alternative, if a review of the VIN database reveals that the vehicle is not equipped with ADAS ECUs, the faster and less costly third-party supplied scanning program may be utilized. Such a decision may be aided if the VIN entry in the VIN database for an ADAS equipped vehicle includes at least one part number of an ADAS ECU associated with the VIN. Alternatively, the VIN entry in the VIN database for an ADAS equipped vehicle may include some other indication in the VIN database that the VIN is associated with an ADAS equipped vehicle. Therefore, if a vehicle's VIN entry in the VIN database does not include an ADAS ECU part number or some other indication that the VIN is for an ADAS equipped vehicle, the third-party supplied scanning program may be selected.

Still further, system 20 may be configured to accept operator input to obtain vehicle data information used to select a desired diagnostic evaluation program 53a, 53b appropriate to a particular vehicle 22 under test. For example, system 20 may prompt an operator 24 to enter vehicle make and model information, such as via interface 66. System 20 may then provide step-by-step inquiries to operator 24 regarding systems installed on vehicle 22, such as whether vehicle 22 includes particular cameras at particular locations, or specifically whether vehicle 22 has particular ADAS systems. Upon entering this information into system 20, system 20 may then selectively activate an appropriate diagnostic evaluation program 53a, 53b for the vehicle 22.

Although database 50b is disclosed above as residing in local computer 30, such a database may additionally or alternatively reside in a memory 44 of vehicle interface device 28 and/or in the memory of a remote computer, such as a remote server 64. If the database is located in a remote server 64, the vehicle interface device 28 and/or the computer 30 may access the database via their respective Internet interfaces 68, 52. Optionally, the database, such as a database found on the remote computer or server 64, may be a compiled database of VINs and/or ECUs provided by a third party. Still further, the database found in either of the memories 44, 50 of the vehicle interface device 28 or the computer 30, respectively, may be a local database that comprises a portion of the information, where the database found on the remote computer or server 64 is remote and contains additional or alternative information. For example, the database may be progressively expanded to include those VINs and/or associated ECU part numbers for vehicles previously serviced at a particular service station or automotive repair business. Optionally, the database may be updated, such that an operator may add a new vehicle VIN and associated ECU part numbers. The database may thus be a tool for identifying which vehicles are equipped with ADAS subsystems and therefore need to be queried/scanned with a more in-depth scanning program, such as a manufacturer supplied scanning program.

Computer 30 may, either in addition to the above noted various loaded diagnostic applications or in place thereof, be used to access remotely located diagnostic applications, such as that may reside on remotely located servers 64. This may be done, for example, to avoid the need for obtaining and locally storing and maintaining diagnostic applications on computer 30. In the illustrated embodiment, computer 30 includes an input/output (I/O) interface 66 for coupling to peripheral devices, such as one or more of a monitor, keyboard, mouse, and the like. In a further illustrated embodiment, the computer 30 is implemented as a laptop computer with integrated monitor, keyboard, and mouse. Still further, interface device 28 and computer 30 may be structurally integrated.

Figure 2:
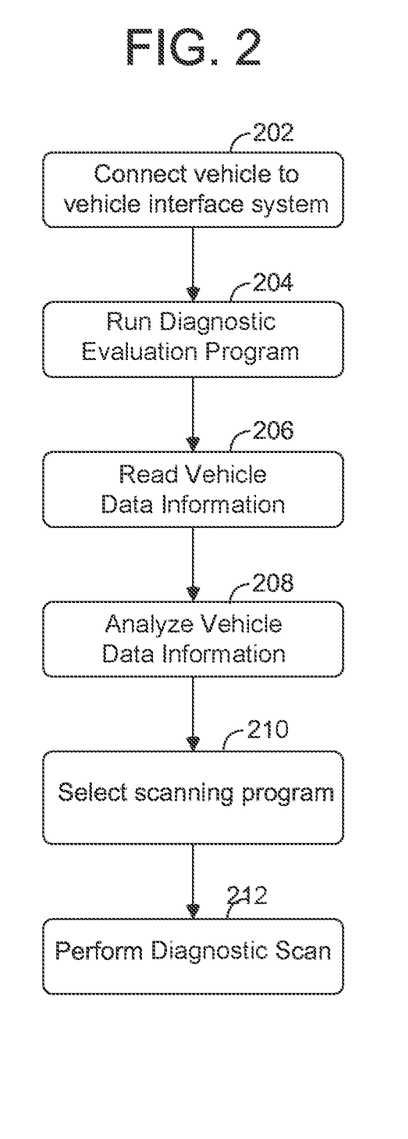
FIG. 2 is a flow diagram of a method for selecting a scanning program in accordance with the present invention.

A method for selecting a scanning program in accordance with aspects of the present invention is illustrated in FIG. 2. In step 202 of FIG. 2, a vehicle 22 to be evaluated is communicatively coupled to a vehicle interface device 28 via a vehicle cable 42. In step 204 of FIG. 2, a diagnostic evaluation program 51 is run to acquire vehicle data information, as illustrated in step 206, such as to acquire a VIN of the vehicle 22 and/or to acquire the part numbers of the ECUs present on the vehicle. Optionally, steps 204 and 206 may be performed without the use of the diagnostic evaluation program 51, such as by use of an alternative means for acquiring the vehicle's VIN or vehicle systems on the vehicle. In step 208 of FIG. 2, the vehicle information data is analyzed, such as by processing a comparison with a database of VIN and/or ECU part numbers. It should be appreciated that more than one database may be employed, such as different databases based on make of vehicle and/or use of databases locally and/or remotely.

In step 210 of FIG. 2, a scanning program is selected such as based upon the vehicle systems, such as ADAS systems associated with the VIN and/or such as based on ECU part numbers read from the vehicle or found in a database based on the VIN. In an aspect of the present invention, if one or more of the associated ECU part numbers are for ADAS ECUs, the selected scanning program will be an OEM or manufacturer supplied scanning program for the vehicle make/model. Alternatively, if one or more of a selected series of ECU part numbers are included in the associated ECU part numbers, the selected scanning program will be the manufacturer supplied scanning program. If none of the associated ECU part numbers are for ADAS ECUs, or in the alternative, if none of the associated ECU part numbers are included in the selected series of ECU part numbers, the selected scanning program may be a third-party supplied scanning program. In step 212 of FIG. 2, the selected scanning program is run and all or substantially all of the ECUs in the vehicle under test are queried/scanned and assessed whereby the fault or error codes are read.

When the vehicle's VIN and/or ECU part numbers are not associated with information within a compared database, in an aspect of the present invention, the VIN and ECU part numbers may be separately investigated for updating of the databases. Alternatively, the vehicle 22 may be physically inspected for the presence or absence of particular vehicle systems, such as ADAS systems, with the appropriate diagnostic evaluation program being run based thereon.

As noted, a user interface on either of the vehicle interface device 28 and the computer 30 allows for the operator 24 to directly enter information into system 20. The same user interface may also be used to enter notations regarding the presence or absence of ADAS subsystems in the vehicle 22. It is also understood that the controller 29 of the vehicle interface device 28 may alternatively be configured to perform the database searching and the scanning program selection discussed above. Alternatively, the computer 30 is operable to perform the database searching and the scanning program selection discussed above.

System 20, in addition to performing scanning operations, may also be used for reprogramming of vehicle 22, such as reprogramming selected ECUs, including reprogramming ECUs based on a determination of particular fault codes.

In the above discussed embodiments, the vehicle interface device 28 and the computer 30 are shown as separate components that are linked together, such as by way of a cable 72. In an alternative embodiment, however, the vehicle interface device 28 and the computer 30 may be integrated together to operate as a vehicle maintenance computer system, as indicated by reference number 76 in FIG. 1. A computer system 76 may comprise a case or housing within which a vehicle interface device and computer are integrated.

Although vehicle interface device 28 is discussed above as conforming with the SAE J2534 standard, it should be appreciated that alternatively configured vehicle diagnostic and programming tools may be employed within the scope of the present invention, including alternatively configured tools for alternative types of vehicles, such as alternative classes of vehicles. Accordingly, an interface tool may conform with the ISO 22900 standard, or RP1210 standard, or may operate under the ELM327 command protocol.

As noted, the software and/or hardware of diagnostic and programming tools may be required to be updated to operate with new vehicles and/or enable programming and diagnosing of existing vehicles. In the above noted embodiments the vehicle interface device 28 may be periodically updated via an Internet connection, such as via computer 30, or may be returned to the supplier for updating, including with regard to hardware updates. This may be done by the supplier of the vehicle interface device 28 whereby the local operator 24 need not spend time attempting to maintain the equipment.

In the illustrated embodiment local computer 30 is disclosed as including both the diagnostic evaluation program 51 as well as multiple diagnostic scanning programs 53a, 53b. It should be appreciated that alternative arrangements may be employed within the scope of the present invention. For example, program 51 and/or programs 53a, 53b may reside on different devices. In one alternative diagnostic evaluation program may reside on a vehicle scan device 28. Likewise, diagnostic scanning programs 53a, 53b may reside on different computer devices from each other. For example, an operator 24 may first utilize one device with a diagnostic evaluation program 51 to determine which diagnostic evaluation program is appropriate for the vehicle 22, and then select from alternative computer devices to run the determined diagnostic evaluation program. Still further, although diagnostic evaluation program 51 and diagnostic scanning programs 53a, 53b are illustrated and discussed herein as being separate programs, one or more of such programs may be combined together and operate as subroutines.

The vehicle interface device 28, with or without the computer 30, may be used to scan ECUs of a vehicle under test for error codes while using a scanning program that performs a minimum number of ECU queries possible, while also querying any ADAS ECUs in the vehicle. Less costly and faster scanning programs, such as third-party supplied scanning programs may be used instead of a manufacturer supplied scanning program when, for example, there are no ADAS ECUs in the vehicle under test. A manufacturer supplied scanning program may be used, however, when the vehicle under test includes ADAS ECUs to insure an in-depth scanning of the electrical system 23 of the vehicle 22. Thus, when appropriate, a vehicle under test may be scanned for ECU error codes using a more efficient and minimally expensive with respect to monetary cost and test duration scanning program that queries/scans a substantial majority of the vehicle's ECUs.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A method of diagnosing a vehicle electrical system comprising:
    providing a computer system comprising a vehicle interface computer, said vehicle interface computer configured to operate in a mode to diagnose a vehicle;
    connecting said vehicle interface computer with a diagnostic port of the vehicle to be in communication with an electrical system of the vehicle prior to completing service or repairs to the vehicle;
    reading vehicle data information of the vehicle with the vehicle interface computer after said connecting said vehicle interface computer with the diagnostic port of the vehicle; and
    determining with the computer system whether particular electrical vehicle systems are present on the vehicle based on the vehicle data information, wherein the particular electrical vehicle systems comprise Advanced Driver Assistance Systems (ADAS) systems, and wherein said determining whether particular electrical vehicle systems are present on the vehicle comprises determining whether any ADAS systems are present on the vehicle.

2. The method of claim 1, wherein said determining with the computer system whether ADAS systems are present on the vehicle based on the vehicle data information comprises determining whether the electrical system of the vehicle includes one or more ADAS electronic control units (ECUs).

3. The method of claim 1, wherein said reading vehicle data information of the vehicle comprises reading a vehicle identification number (VIN) of the vehicle, and wherein said determining whether particular electrical vehicle systems are present on the vehicle comprises using a database to analyze the VIN of the vehicle, and wherein the database comprises a VIN database, and wherein the VIN database includes information regarding the electrical vehicle systems present on the vehicle based on the VIN of the vehicle.

4. The method of claim 1, wherein said reading vehicle data information of the vehicle comprises reading electronic control unit (ECU) part numbers of the vehicle.

5. The method of claim 4, wherein said determining whether particular electrical vehicle systems are present on the vehicle comprises using a database to analyze the ECU part numbers of the vehicle.

6. The method of claim 5, wherein the database comprises an ECU part number database, and wherein the ECU part number database includes ECU part numbers for Advanced Driver Assistance System (ADAS) system ECUs.

7. The method of claim 1, wherein said computer system further comprises a computer interfaced with the vehicle interface computer, and wherein a plurality of available diagnostic scanning programs are contained on the computer.

8. The method of claim 7, wherein the computer is local to the vehicle when the vehicle interface computer is connected with the vehicle.

9. The method of claim 1, wherein said computer system further comprises a diagnostic evaluation program, and wherein said diagnostic evaluation program is used in said determining with the computer system whether particular electrical vehicle systems are present on the vehicle.

10. The method of claim 9, wherein said computer system further comprises a computer interfaced with said vehicle interface computer, and wherein said diagnostic evaluation program and a plurality of diagnostic scanning programs are stored on said computer.

11. A method of diagnosing a vehicle comprising:
providing a vehicle interface computer, said vehicle interface computer configured to operate with a selected scanning program, wherein the vehicle interface computer is configured to diagnose a vehicle;
connecting said vehicle interface computer with a diagnostic port of a vehicle to be in communication with an electronic control unit (ECU) of a vehicle;
reading vehicle data information of the vehicle with the vehicle interface computer after connecting said vehicle interface computer with the diagnostic port of the vehicle; and
determining whether the vehicle includes Advanced Driver Assistance Systems (ADAS) subsystems based on the vehicle data information.

12. The method of claim 11, wherein said determining whether the vehicle includes ADAS subsystems comprises determining whether the vehicle includes ADAS ECUs.

13. A vehicle diagnostic system comprising:
a vehicle interface computer, said vehicle interface computer configured to be operatively connected with a vehicle in order to diagnose an electrical system of the vehicle;
a diagnostic evaluation program, said diagnostic evaluation program configured to query the electrical system of the vehicle when said vehicle interface computer is connected with the vehicle with said diagnostic evaluation program operative to read vehicle data information from the electrical system of the vehicle;
a computer, said computer being communicatively connected with said vehicle interface computer and being operable to obtain said vehicle data information from said diagnostic evaluation program;
a database, said computer configured to access said database to determine whether the vehicle includes particular vehicle systems based on said vehicle data information;
wherein said computer is configured to access said database to determine whether the vehicle includes Advanced Driver Assistance Systems (ADAS) vehicle systems based on said vehicle data information.

14. The system of claim 13, wherein said vehicle interface computer and said computer comprise separate devices connected by a cable or a wireless connection.

15. The system of claim 13, wherein said computer includes said diagnostic evaluation program and a plurality of diagnostic scanning programs.

16. The system of claim 13, wherein said vehicle data information comprises the vehicle identification number (VIN) of the vehicle, and wherein said database comprises a database correlating vehicle VINs with vehicle systems for the make and model of the vehicle.

17. The system of claim 13, wherein said vehicle data information comprises part numbers of electronic control units (ECUs) of the vehicle, and wherein said database comprises a database correlating ECU part numbers with vehicle systems for the make and model of the vehicle.

18. The system of claim 13, further comprising a remote computer accessible by said computer via an Internet connection, and wherein said database resides on said remote computer.

* * * * *